US006985740B2

(12) United States Patent
Shyy et al.

(10) Patent No.: US 6,985,740 B2
(45) Date of Patent: Jan. 10, 2006

(54) SYSTEM FOR AND METHOD OF PROVIDING PRIORITY ACCESS SERVICE AND CELL LOAD REDISTRIBUTION

(75) Inventors: Dong-Jye Shyy, McLean, VA (US); Mike Nissley, Reston, VA (US); James Marshall, Purcellville, VA (US)

(73) Assignee: Green Wireless LLC, Los Altos, CA (US)

( * ) Notice: Subject to any disclaimer, the term of this patent is extended or adjusted under 35 U.S.C. 154(b) by 485 days.

(21) Appl. No.: 10/214,885

(22) Filed: Aug. 8, 2002

(65) Prior Publication Data

US 2004/0029592 A1 Feb. 12, 2004

(51) Int. Cl.
*H04Q 7/20* (2006.01)

(52) U.S. Cl. ................ 455/453; 455/404.1; 455/435.3; 455/453

(58) Field of Classification Search ............. 455/404.1, 455/435.3, 453, 452.1, 509, 41.2, 41.3, 512, 455/521, 445, 421, 515, 553.1
See application file for complete search history.

(56) References Cited

U.S. PATENT DOCUMENTS

| 5,388,147 | A | | 2/1995 | Grimes |
| 5,479,482 | A | | 12/1995 | Grimes |
| 5,920,815 | A | * | 7/1999 | Akhavan ................ 455/426.1 |
| 6,185,423 | B1 | * | 2/2001 | Brown et al. ............... 455/434 |
| 6,356,767 | B2 | * | 3/2002 | Froula ......................... 455/512 |
| 6,374,099 | B1 | * | 4/2002 | Bi et al. .................. 455/404.1 |
| 6,603,977 | B1 | * | 8/2003 | Walsh et al. ................. 379/45 |
| 2002/0065045 | A1 | * | 5/2002 | Kim .............................. 455/41 |
| 2002/0142789 | A1 | * | 10/2002 | Kuhl et al. ................. 455/512 |
| 2004/0203563 | A1 | * | 10/2004 | Menard .................... 455/404.1 |

OTHER PUBLICATIONS

NE/EP Wireless Priority Service (WPS) Industry Requirements Document for the Initial Operating Capability (IOC) for CDMA—based Systems, Issue: 1.0, Feb. 22, 2002.
NE/EP Wireless Priority Service (WPS) Industry Requirements Document for the Initial Operating Capability (IOC) for GSM—based Systems, Issue: 1.0, Feb. 22, 2002.

* cited by examiner

*Primary Examiner*—Sonny Trinh
*Assistant Examiner*—Un C Cho
(74) *Attorney, Agent, or Firm*—Townsend and Townsend & Crew LLP

(57) ABSTRACT

Systems of and methods for providing cellular priority access and topological guidance information to cellular users are described, employing wireless ad hoc network and cellular logic. A centralized aspect of acquiring cell loading information and geographic coordinates is combine with a distributed scatternet forming aspect to enable guidance information to be computed and indicated to the user. The guidance information is reflective of cell loading and congestion status of neighboring cells, as well as the availability of alternative radio resources in the user's current cell or neighboring cells. The system may also be employed in re-distributing cell traffic among cells to optimally balance cell loads.

31 Claims, 8 Drawing Sheets

FIG.8

| Bluetooth ID 88 | Sequence No. 90 | Timestamp 92 | Routing List 94 BT ID-1, BT ID-2,......BT ID-N |
|---|---|---|---|

| Candidate cell ID 98 | Candidate cell loading data 100 | Candidate device ALI data 102 | Master ID 104 | Hop Counter 106 | Sequence Number 108 | Timestamp 110 | Routing List 94 |
|---|---|---|---|---|---|---|---|

96

SYSTEM FOR AND METHOD OF PROVIDING PRIORITY ACCESS SERVICE AND CELL LOAD REDISTRIBUTION

FIELD OF THE INVENTION

The present invention relates in general to wireless communications systems, and more specifically to systems and methods for relieving cell congestion and providing Priority Access Service (PAS) to authorized subscribers.

BACKGROUND OF THE INVENTION

National security and emergency preparedness (NS/EP) personnel have become dependent on commercial wireless communications for the performance of their mission. NS/EP personnel frequently require wireless connectivity in order to provide communications in a mobile environment when responding to emergencies such as earthquakes, hurricanes, and floods. Commercial wireless service provides a cost-effective capability for NS/EP communications that leverages the use of publicly available wireless telephony rather than a cost-prohibitive private network. In addition to minimizing costs and deployment time, this arrangement provides broad accessibility.

However, following a disaster, severe cellular network congestion in any surviving telecommunication systems can cause high call blocking in wireless communications. Thus a priority access service (PAS) has been deemed necessary to enable critical disaster relief officials to provide services when they are most needed. A wireline PAS currently exists, the Government Emergency Telecommunications Service (GETS) program, but a wireless capability is still lacking. Even in non-disaster situations, a high volume of call traffic can create congestion in cellular networks, leading to a need for redistribution of the cell load.

The US National Communications System (NCS) was chartered to work with cellular and personal communications services (PCS) operators and vendors to provide wireless PAS for NS/EP personnel during emergency situations. The PAS program has been implemented through a series of Federal Communications Commission (FCC) rules and orders that establish the regulatory, administrative, and operational framework that enables commercial mobile radio service (CMRS) providers to offer PAS to NS/EP personnel. CMRS providers include cellular licensees, broadband personal communications service (PCS) licensees, and specialized mobile radio (SMR) licensees.

The initial operating capability (IOC) for PAS is to provide "radio" priority access for Code Division Multiple Access and Global System for Mobile Communication (GSM) air interfaces by Dec. 31, 2002, i.e., PAS originating calls have a higher priority for access to next available radio resource than public (non-priority) calls. (See *NS/EP Wireless Priority Service (WPS) Industry Requirements Document for the Initial Operating Capability (IOC) for CDMA-based Systems*, Issue: 1.0, Feb. 22, 2002; and *NS/EP Wireless Priority Service (WPS) Industry Requirements Document for the Initial Operating Capability (IOC) for GSM-based Systems*, Issue: 1.0, Feb. 22, 2002.) The full operating capability (FOC) is to provide end-to-end priority access by Dec. 31, 2003. The basic mechanism proposed is to queue priority call requests when there are no radio channels available. As radio channel becomes available, preference will be given to queued priority calls. In the current implementation of IS-95/cdma2000 CDMA base station (BS) and base station controller (BSC), there is no call queuing capability. As a result, priority queues are required to be added to the BS/BSC. GSM base station sub-system (BSS) already has the call queuing capability. As a result, minimal change is required for the GSM BSS to support PAS. PAS is activated on a per call basis and is applicable to mobile-to-wireline, wireline-to-mobile and mobile-to-mobile links. When an NS/EP user places a PAS call and the service is activated, the mobile station (MS) requests a voice channel via the control channel messaging. In a congested environment, the NS/EP caller is placed in a queue and will be given the next available voice channel. PAS does not preempt calls in progress and is to be used only in emergency situations where network congestion is blocking call attempts, however the invention as described below is not limited in this regard.

Another task of the FCC is enforcement of the Wireless Communications and Public Safety Act of 1999 (the "911 Act"), which mandates the FCC to promote "safety of life and property through the use of wire and radio communication." To this end, the FCC has adopted requirements that cellular, broadband PCS, and certain Specialized Mobile Radio (SMR) licensees implement 911 and E911 services. One of the requirements is that wireless carriers and cell phone manufacturers provide the capability not just to deliver 911 calls to emergency dispatchers, or Public Safety Answering Points (PSAPs), but also to automatically identify to the PSAPs the location from which a wireless call is being made. The 911 Act's requirements were divided into two phases. Phase I required wireless carriers to deliver the telephone number of the handset originating an E911 call, and the location of the cell site or base station receiving the E911 call, to the PSAPs. Phase II requires carriers to deliver more specific latitude and longitude location information, known as Automatic Location Identification (ALI) to the PSAPs. Full implementation of this phase is expected by the end of 2005, but by Dec. 31, 2002, all new digital handsets are to be activated by wireless carriers are to be ALI-capable.

A variety of techniques (e.g., GPS, Angle of Arrival, Time Difference of Arrival, and others) are currently being used to implement ALI capabilities. U.S. Pat. Nos. 5,388,147 and 5,479,482 to Grimes teach combining a cellular telephone and a GPS receiver so that the phone's approximate physical location, i.e., its approximate geocoordinates, can be reported as part of the emergency call. Alternatives to GPS exist, but every technique for enabling ALI results from measuring the cellular device's position by reference to established points whose positions are known. The cellular device's location is estimated to lie at the best intersections (in a least-squares or maximum likelihood sense, since all location measurements have random errors) of curves whose shapes and locations are determined by the particular technique utilized.

Thus, a need exists for assisting NS/EP personnel in acquiring PAS. A system that accomplishes this objective by leveraging existing technological architectures would be quite useful.

Additionally, cell congestion causes blocking problems for the general population of wireless subscribers. What is needed is a way for any user of a mobile wireless system to acquire access to cellular services when the cell in which the user is currently located is congested. Such a system may serve to alleviate cell congestion by redistribution of cell loading to less congested cells.

SUMMARY OF THE INVENTION

In one aspect the present invention is directed to a telecommunications system for and method of providing cellular priority access service to a NS/EP user. The invention provides a plurality of devices each having an embedded wireless ad hoc networking (WAHN) logic module, wherein the plurality of devices includes the user's cellular device and at least one candidate cellular device. The user's cellular device and the one or more candidate cellular device(s) each have embedded cell logic modules and are E911 enabled, i.e., they are capable of receiving the information needed to determine their own longitudinal and latitudinal positions under the ALI framework.

If the user requests PAS while located in a congested cell, the devices operate to provide the user with one or more of the following indications: the direction(s) to one or more free or less congested "candidate" cells, the distance(s) to the candidate cell(s), the cell loading status of the candidate cell(s), and/or the radio resource (other frequency, code, service provider, or private network) that can be utilized in the candidate cell(s). This is accomplished through the interaction of the WAHN logic modules and the cell logic modules. Specifically, the cell logic modules operate to receive cell congestion, cell loading or radio resource information of the cell in which they are presently located, which is being transmitted to them over a control channel by a base station (BS). The cell logic module of each cellular device transfers the received cell congestion, cell loading or radio resource as well as ALI information to a corresponding WAHN logic module in the same cellular device. Through protocols described below, the WAHN logic module of the user's cellular device initiates the creation of a scatternet among the WAHN logic modules of the plurality of devices. The scatternet is grown for a predetermined time interval or until it includes at least one candidate cellular device whose WAHN logic module is indicating existence of a free cell, a less congested cell than the cell in which the user is located, or alternative radio resources. The cell location, cell loading status, and radio resource information from the at least one candidate cellular device is gathered and transmitted to the WAHN logic module of the user's cellular device. There, it is received and, if needed, utilized in computing topological information that is then communicated to the cell logic module of the user's cellular device. The user's cell logic module then provides, through an interface, a message (e.g., visual or audial) to the user that is reflective of the computed topological information that may be utilized in determining whether to acquire the desired PAS by moving to another cell based on the distance and cell loading status, or whether to stay at the same location and acquire access to the alternative radio resource using the radio resource information provided.

In a preferred embodiment, the user is preferably a member of a NS/EP organization who has been assigned a certain PAS priority class or level consistent with the FCC's PAS framework. In certain embodiments, the method described above further comprises the step of temporarily blocking the public users from making cellular calls. This may be implemented in a manner similar to what has been done in extent cellular networks by blocking a user's access to the cellular network based on the user's class. For example, a class 1 user can always send his dialed string to the cellular network. However, a class 2 user may be blocked 50% of the time. The FCC's PAS framework categorizes priority users into five classes. Accordingly, even among priority users not all capacity in a cell may be available to NS/EP users of a lower class, and there may additionally be an upper threshold for any NS/EP usage per cell. As a result, it is crucial for NS/EP users to be evenly spread among cells to achieve the optimal performance.

In another embodiment, the present invention provides a system and method through which a public (non-NS/EP) user may acquire access to a free or less-congested cell. Using a similar approach, the public user may obtain topological information relating to nearby cells with better grade of service and determine whether to move to one of them or simply wait for the cell in which the user is currently located becomes free or less congested. A means for determining whether the user should be granted access to the system based upon the user's authorization (or priority class) and/or upon the existence of emergency usage conditions may optionally be employed.

In another embodiment, the present invention provides a system for and method of re-distributing public user cell loading evenly among cells, thereby optimizing the cellular network capacity. The plurality of devices described above is used in this embodiment to determine which cell or cells are less congested and therefore better able to provide access to a requesting user. Once those cells are determined, the topological information provided to the requesting user from the cell logic module of his cellular device take the form of an instruction to the requesting user to proceed in a particular direction to the less congested cell, where the desired access will be granted.

In another embodiment, the present invention provides a system and method through which a user without any cellular coverage may acquire access to a cell with coverage. In this embodiment, the user's cellular device may not have the benefit of knowing its own precise geographic coordinates, but approximate topological guidance information may yet be computed from the geographic coordinates of the WAHN logic modules along the path from the one or more candidate devices to the WAHN device nearest to the user. Also, if alternative radio resources are available in the cell in which the user is located, no topological guidance information is required.

In yet another embodiment, the present invention provides a telecommunications system with an ad hoc networking capability useful in forming priority scatternets. Priority users can utilize the scatternet to communicate with other priority users as peer-to-peer communication. Specialized Bluetooth profiles need to be defined for these usages. Due to the scatternet formation protocol used, messages between the priority users are routed via a route with minimum hop count.

As used herein, the term "cellular device" refers to cellular telephony equipment in communication with a cellular network, including phones, personal digital (or data) assistants, and other PCS equipment. The term "cell" is used below to refer to one or more specific geographic regions covered by a base station in the cellular network. The terms "free" or "free cell" as used below describe cellular service conditions that have no congestion, little congestion, or substantially less congestion when compared to the cellular service conditions of the cell a user is presently occupying.

BRIEF DESCRIPTION OF THE DRAWING

FIG. 8 is a representation of the data portion of a FIND_FREE_CELLS message that might be employed by the present invention.

FIG. 9 is a representation of the data portion of a FREE_CELL_FOUND message that might be employed by the present invention.

DETAILED DESCRIPTION OF CERTAIN PREFERRED EMBODIMENTS OF THE INVENTION

Preferred embodiments of the invention will now be described with reference to the accompanying drawings.

Overview

The present invention utilizes the strength of two separate technologies, cellular and ad hoc networking. A centralized scheme is utilized to send cell congestion, cell loading, or radio resource information to each cell phone using the existing cellular technology. A distributed scheme is adopted using a wireless ad hoc networking technology to interconnect all cellular devices of interest, and route cell location, cell congestion, cell loading, or radio resource information to a user. While much of the description that follows is in terms of the Bluetooth™ ad hoc networking protocol, said description is not meant to be limiting. Artisans will appreciate that other wireless ad hoc networking technologies can be used alternatively and are within the scope of the present invention. The rationale for selecting the Bluetooth technology to perform ad-hoc networking is that it is expected that Bluetooth will be embedded in every cell phone by the year 2003. In addition, all Bluetooth devices are interoperable with each other. Another advantage of using Bluetooth for interconnecting cell phones is that cellular radio resources are not tied up, since the cellular radio resource is especially precious when the cell is congested. Since Bluetooth's coverage range is limited (10 meter–100 meter), the proposed approach is more valuable in an urban environment, where microcells or picocells are deployed and the distance separation between cell phones is within the communication range of Bluetooth. Since the cells are not balanced in the current cellular network, it is likely that a user will not have to travel far to find a less-congested cell.

Figure 1:
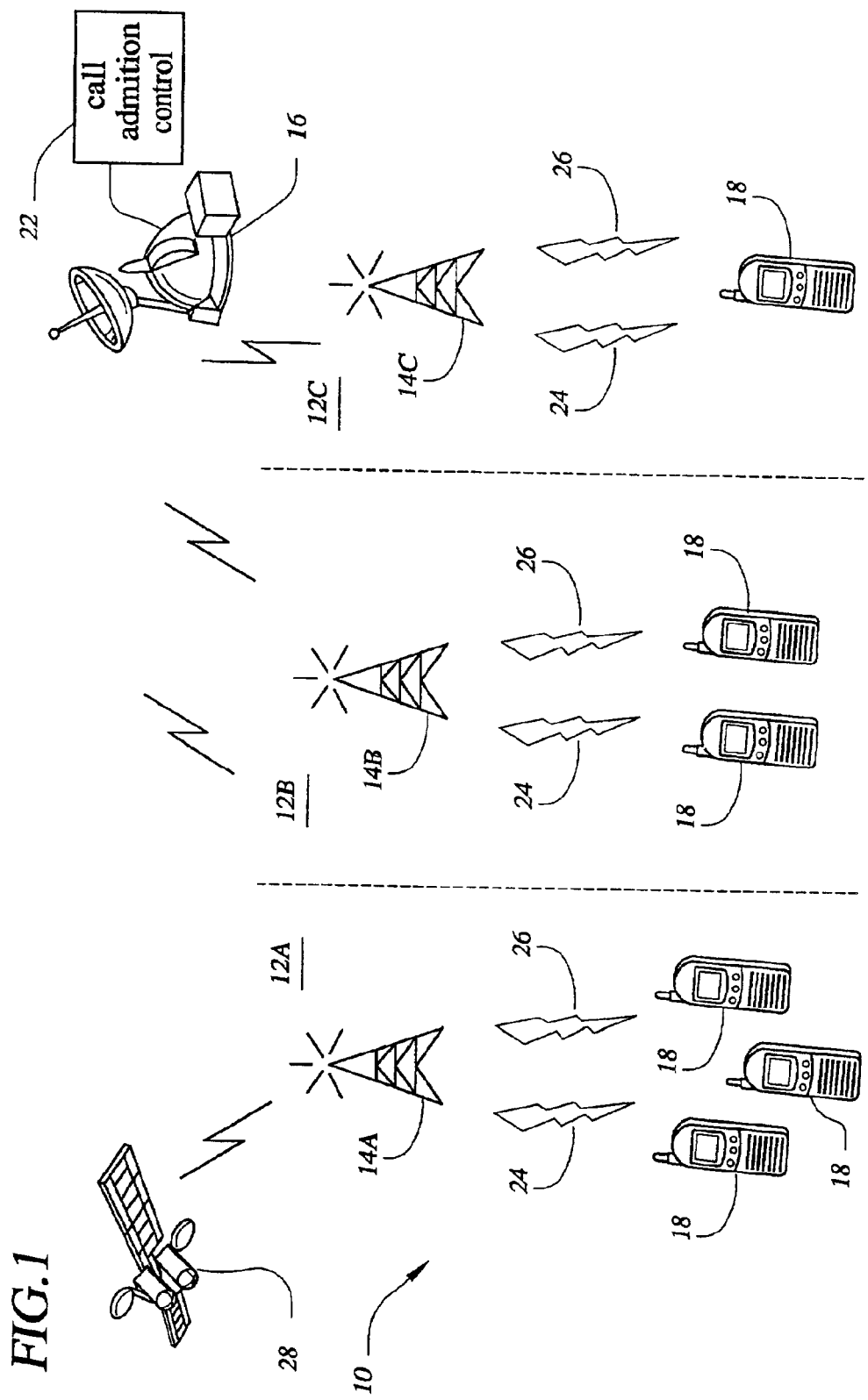
FIG. 1 is an illustration of a centralized cellular network in accordance with an embodiment of the invention.

Referring to FIG. 1, a cellular network 10 in accordance with the invention is arranged in a conventional, centralized architecture, such as GSM. A first tier includes a number of service regions called cells (shown as 12A–C) containing a number of communication nodes, one of which in each cell is designated as a base station 14A–C for that particular cell. The base stations 14A–C provide cellular access within their cell to cellular devices (e.g., phones, PDAs, etc.) 18 equipped with cell logic modules. A second tier is comprised of a backbone network formed of the base stations 14A–C that enable communications between different cells, through a mobile switch center 16. Communications between different cellular devices 18 are accomplished via the base stations 14 and/or mobile switching center 16. Access to cellular service is typically controlled by a call admission controller 22 located within mobile switching center 16. One of the functions of the admission controller is to check authorizations and priority levels of callers requesting access. The centralized architecture is further characterized by two different topologies, namely, tree topology and ring topology, both of which are within the scope of the present invention. Each of the base stations 14A–C transmits audio data over traffic channels 24 and control information over control channels 26. Among the information transmitted to the cellular devices 18 in a particular cell from one of the base stations 14A–C of that cell over the control channels 26 is cell loading information corresponding to that cell. Also appearing in the figure is a GPS satellite 28 broadcasting geolocational information over all of the cells. GPS satellite 28 is an optional part of the inventive system, in that the GPS information is used by some E911-enabled devices to provide Automatic Location Information (ALI), but not all E911-enabled devices.

Figure 2:
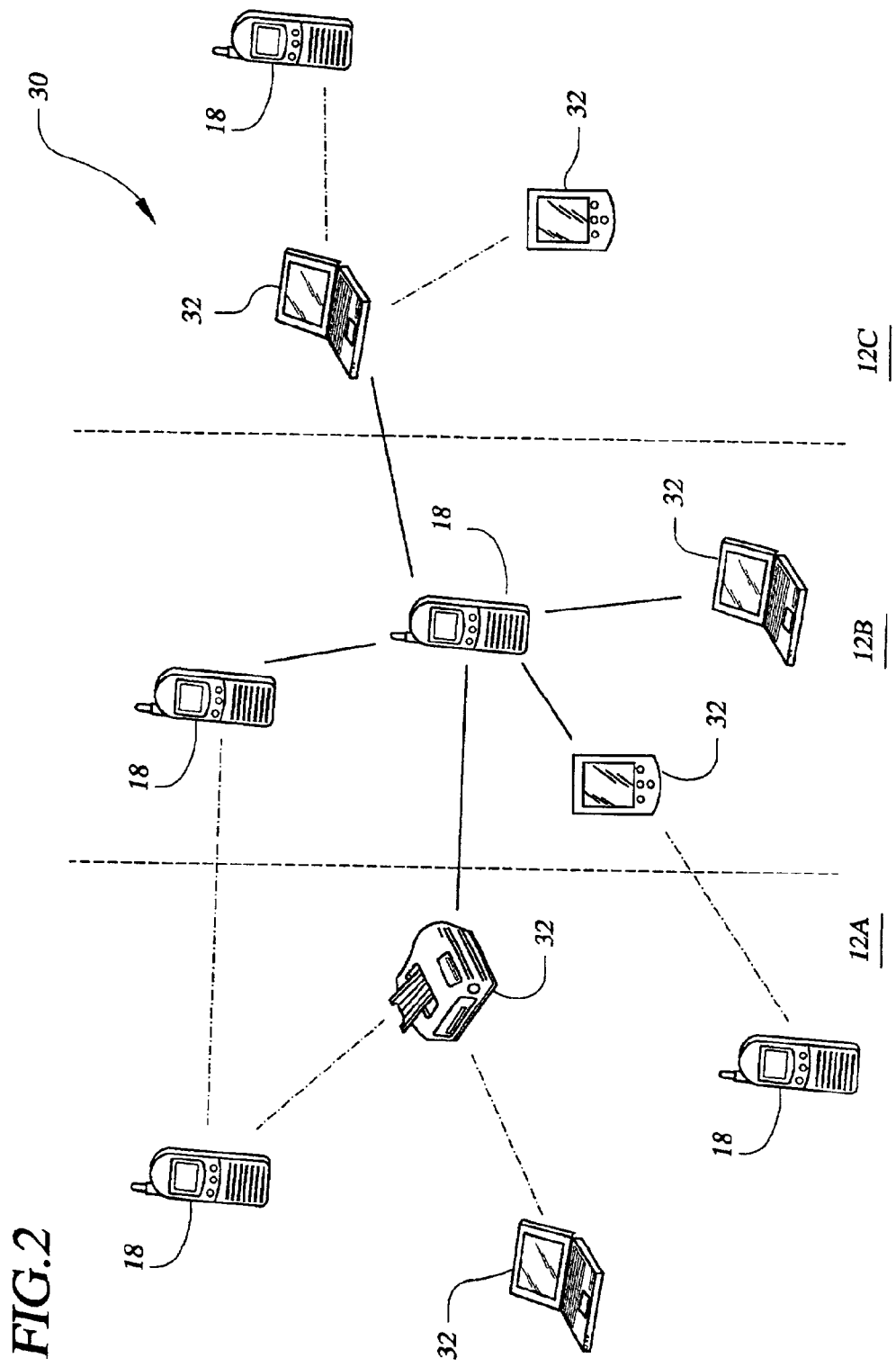
FIG. 2 is an illustration of a wireless ad hoc network in accordance with an embodiment of the invention.

Referring to FIG. 2, in contrast to the centralized architecture, a wireless, distributed (ad-hoc) network 30 comprised of a plurality of devices equipped with wireless ad hoc network (WAHN) logic modules requires no base station. Two such WAHNs operating at or near the 2.4–2.5 GHz ISM (industrial, scientific and medical) band are described by the Bluetooth and IEEE 802.11 standards. This ISM band is available world-wide. The 802.11 standard focuses on the MAC (medium access control) protocol and physical layer protocol for ad-hoc networks. The Bluetooth wireless technology is an industry-based specification for providing short-range radio links between virtually any digital device.

The devices of WAHN 30 are capable of performing switching and communicating directly with each other. The devices of WAHN 30 includes cellular devices 18 as described above, as well as digital devices 32 that may not be equipped with cellular logic modules, which could include fixed and mobile computers and peripherals such as FAX machines, printers, and so on. As stated, each device 18, 32, or node, of WAHN 30 is capable of forming wireless links to one another without the intervention of the base stations 14A–C.

Providing Pas to a Priority User

Figure 3:
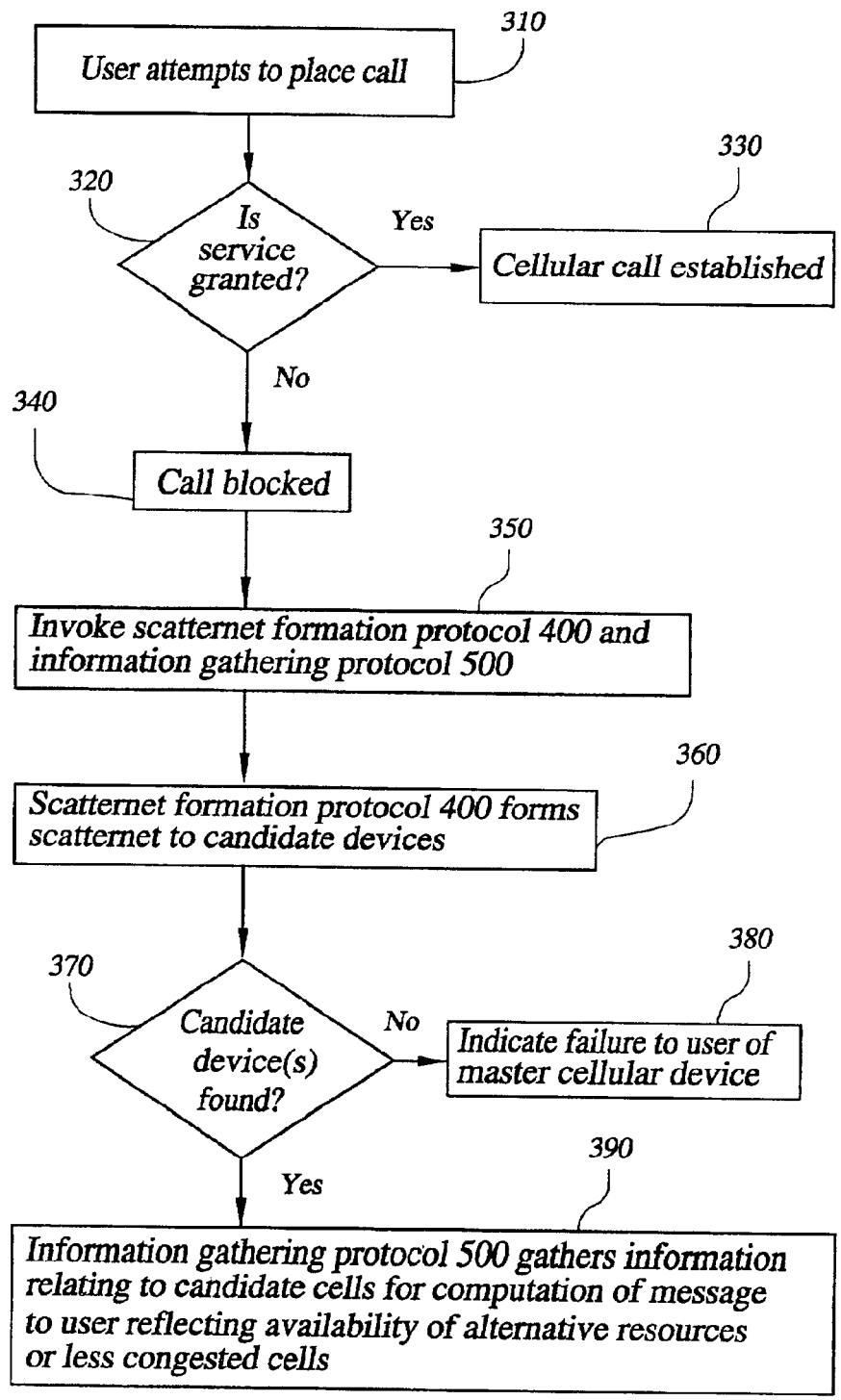
FIG. 3 is a flowchart depicting a process for providing PAS service to a priority user utilizing the present invention.
Figure 6:
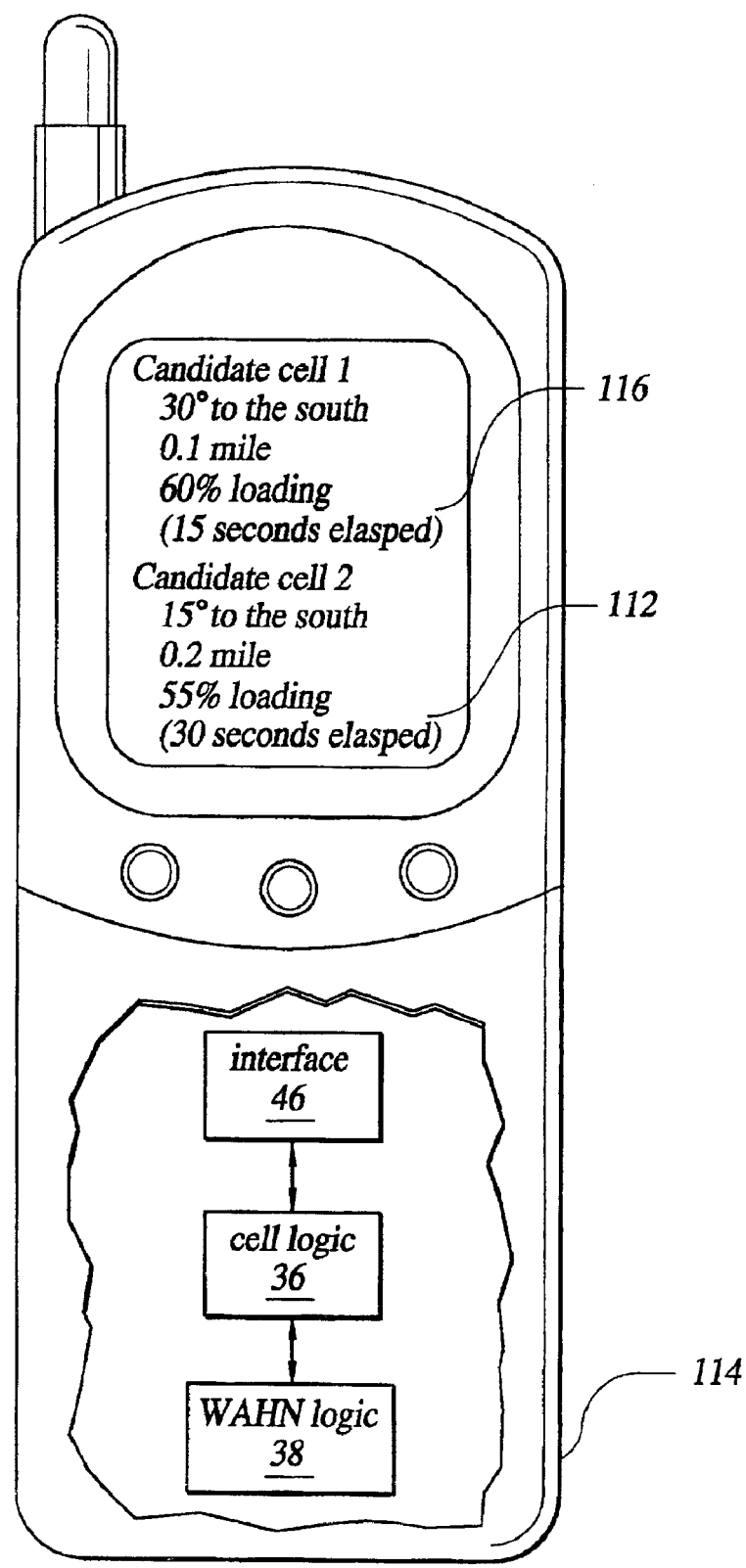
FIG. 6 is an illustration of a user's cellular phone reflecting the display of one embodiment of the information that may be provided relevant to candidate devices by the present invention.
Figure 7:
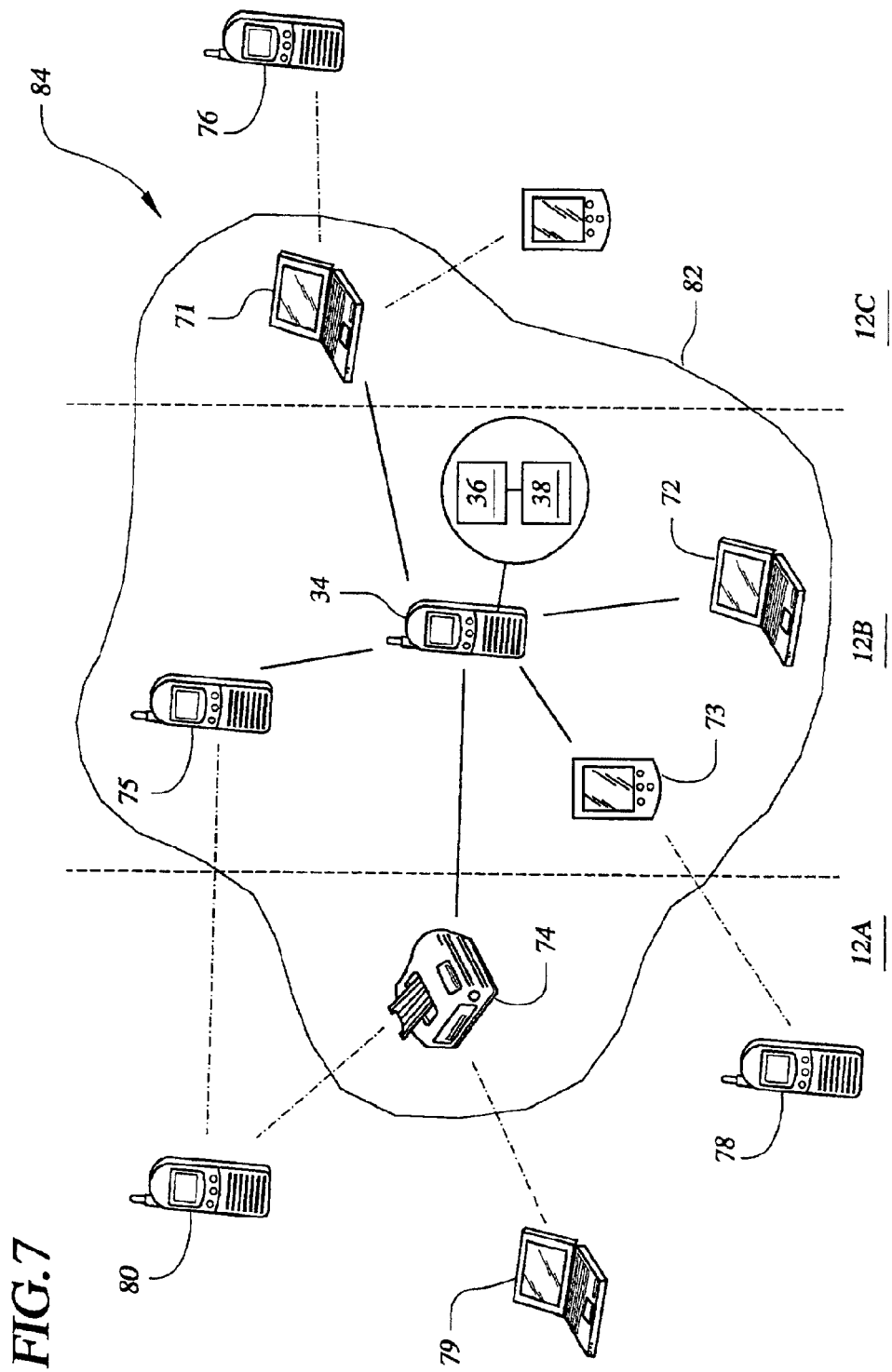
FIG. 7 is an illustration of a scatternet in accordance with an embodiment of the present invention.

A method 300 of using the cellular network 10 and WAHN 30 to provide PAS to priority users (e.g., NS/EP personnel) of a cellular device 34 having a cell logic module 36 and a WAHN logic module 38 (as shown in FIG. 6) will be described with the aid of the flowchart illustrated in FIG. 3 and the telecommunications network illustrated in FIG. 7.

In step 310, the user attempts to place a call through the base station (not shown) corresponding to the cell 12B in which he is presently located.

In step 320, a determination is made whether the request for cellular service is to be granted. This may simply be a matter of available channels, or optionally may additionally be a function of the priority level of the user, if one is assigned. A BS may, in certain embodiments, query a home location register database using the user's cellular number as a key in retrieving the user's associated priority level when an emergency situation occurs. The determination is made preferably by call admission controller 22 (not shown). The cell logic module 36 determines whether access was granted or not.

In step 330, if a channel is available for the user, the cellular call is established and the process ends.

In step 340, if no channels are available to the user, the call is blocked.

In step 350, the user may invoke a scatternet formation protocol 400 and information gathering protocol 500 that will find and provide directions to a free or less congested cell, or an indication of alternative resources available to the user of cellular device 34 in 12B. Invocation of these protocols may be either a manual operation, effected by the pressing of a button, or alternatively may be an automatic process initiated upon call blocking. In step 360, the scatternet formation protocol 400 operates, preferably for a predetermined time interval, to create a scatternet among the devices 34, 71–80 equipped with WAHN logic modules in an attempt to find one or more candidate cellular devices 75, 76, 78, 80 that are able to provide alternative resources, or whose corresponding cell (e.g. cells 12A of 12C) is less congested than cell 12B.

In step 370, a determination is made whether one or more candidate cellular devices were found.

In step 380, if no candidate cellular devices 75, 76, 78, 80 (and, thus, less congested cells or alternative resources) are found in a predetermined time interval, then a message indicating this fact is transferred between the WAHN logic module 38 and cell logic module 36 of the user's cellular device 34. The cell logic module 36 then provides an indication via interface 46, which in the illustration of FIG. 6 is a controller for liquid crystal display (LCD) 112, to the user of the failure.

In step 390, if one or more candidate devices 44 with a less congested corresponding cell or available alternative resources are found in the predetermined time interval, then WAHN information gathering protocol 500 is initiated to collect information about the less congested cell or alternative resource. The collected information is relayed, preferably through a minimum hop WAHN route, back to the user's cellular device 34, where it is used in computing topological information for display to the user. With this information, the user requesting PAS can make a determination which less congested cell (e.g., cell 12A or 12C) to proceed to, or whether to remain in his current cell 12B and acquire the alternative resource. Such alternative radio resources may comprise one or more alternative frequencies, codes, service providers, or private networks that can be utilized.

The scatternet formation protocol 400 and information gathering protocol 500 will now be more fully described in the context of Bluetooth WAHN technology.

As illustrated in FIG. 1, the base stations 14A–C (not shown) broadcast congestion and cell loading status data to cellular devices 18 in their respective cells 12A–C, where it is received by corresponding cell logic modules embedded in each of the cellular devices 18. (An exemplary cell logic module 36 and WAHN logic module 38 are depicted in FIG. 6.) The congestion data could be a simple one-bit implementation, i.e., either congestion or no congestion. Cell loading data typically is defined in terms of the percentage of the cell capacity being used. The cell logic modules also acquire their own ALI geolocational coordinates through whatever technology is employed to implement the requirements of the E911 Act discussed above. The cell logic modules of each cellular device 18 pass their corresponding ALI data and, cell congestion, cell loading, or alternative radio resource data to the Bluetooth logic module embedded in the same cellular device in which the particular cell logic module is embedded. The Bluetooth logic modules makes this data available to other Bluetooth devices that are or will be connected via a scatternet. This data will be used in the scatternet formation protocol 400 and information gathering protocol 500.

Figure 4:
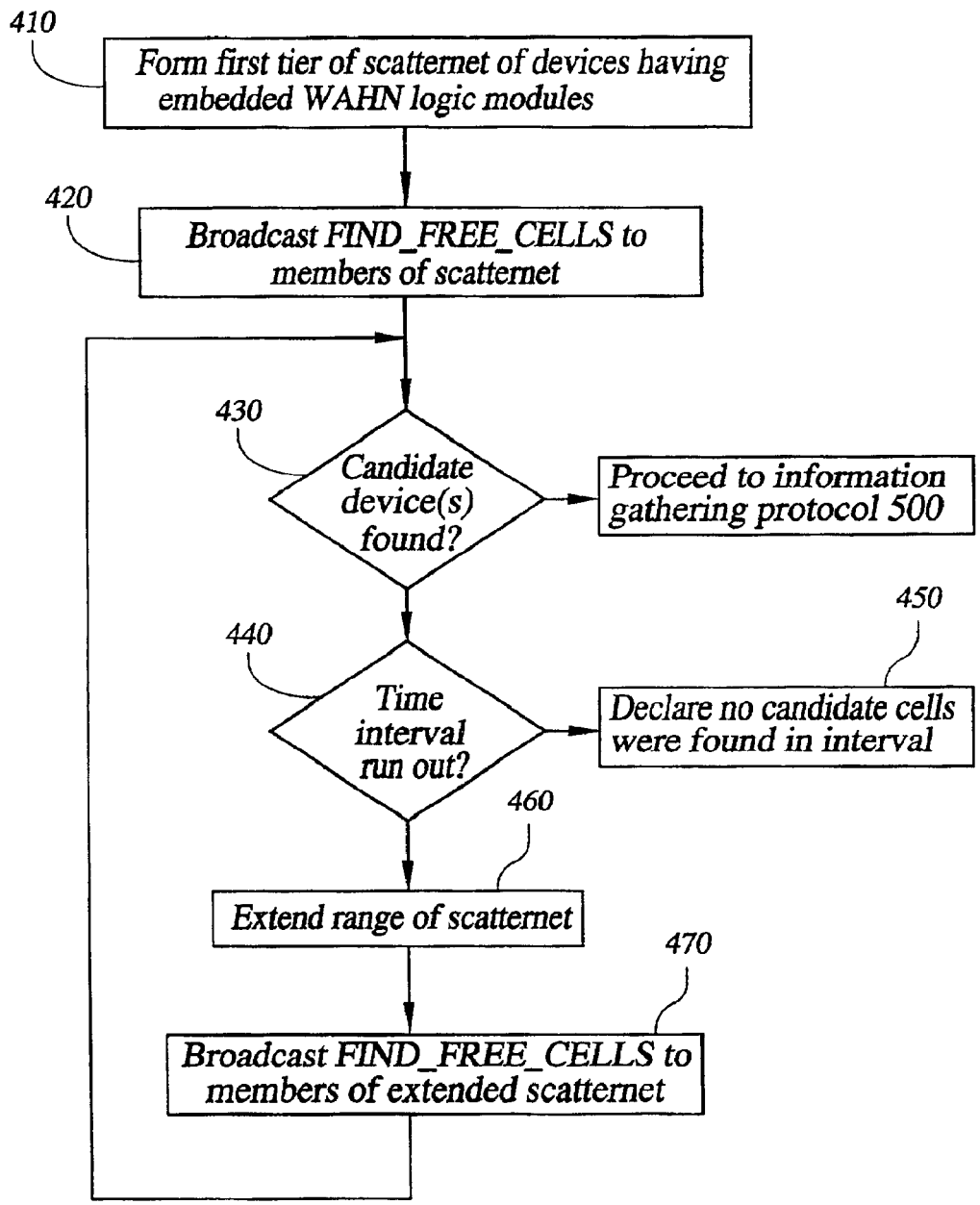
FIG. 4 is a flowchart depicting an embodiment of the scatternet formation protocol provided by the present invention.

FIG. 4 is a flowchart illustrating an embodiment of scatternet formation protocol 400. FIG. 7 will be used to illustrate the state of a Bluetooth piconet and scatternet during the execution of scatternet formation protocol 400. A piconet is simply a collection of digital devices connected using Bluetooth technology in an ad hoc fashion. A Bluetooth piconet can be formed among up to eight devices, with one of the devices serving as a master, and the other seven devices as slaves. A slave can only communicate directly with the master. In FIG. 7, the priority user's cellular device 34 serves as the master over a plurality of slave devices 71–80 arranged in a star network topology.

In step 410, the priority Bluetooth device 38 (i.e., the Bluetooth logic module of the priority user's cellular device) performs an INQUIRY procedure to initiate the formation of a priority piconet with neighboring Bluetooth devices 71–75. Bluetooth device 38 will become the master of a priority piconet 82 and neighboring devices 71–75 are its slaves. The INQUIRY procedure is used when the nearby Bluetooth devices 71–75 are unknown to priority Bluetooth device 38. Each of the nearby Bluetooth devices 71–75 periodically performs an INQUIRY_SCAN procedure by default. Once the priority master Bluetooth device 38 receives INQUIRY_RESPONSE messages from the neighboring Bluetooth devices 71–75, the master commences a PAGE procedure for frequency hop synchronization with the neighboring Bluetooth devices 71–75. The neighboring Bluetooth devices 71–75 each perform PAGE_SCAN procedures. Once the priority master Bluetooth device 38 and the neighboring devices 71–75 exchange PAGE_RESPONSE messages, a first layer of the priority piconet 82 is formed having neighboring devices 71–75 as members of the piconet. This is illustrated by solid lines emanating from the priority master Bluetooth device 38 leading to neighboring devices 71–75.

In step 420, once the first layer of scatternet 84 (which initially is comprised of only priority piconet 82) is built, the priority Bluetooth device 38 broadcasts a FIND_FREE_CELLS message 86 to all the members in the scatternet to find one or more candidate devices whose cell congesting and loading data indicates a corresponding free (or less congested) cell or available alternative resources. The FIND_FREE_CELL message 86, as illustrated in FIG. 8, includes a master Bluetooth unique identification (ID) 88, a sequence number 90 (in case multiple Bluetooth packets are required to convey the resource information), and a time stamp 92 reflecting when the message was sent, to which is appended a routing list 94 comprised of one or more unique IDs of each Bluetooth device through which it traverses. The routing list 94 will be used in information gathering protocol 500. Each Bluetooth device has a globally unique 48 bit IEEE 802 address. This address, called the Bluetooth Device Address (BD_ADDR) is assigned when the Bluetooth unit is manufactured and it is never changed. In preferred embodiments, the unique IDs comprise either the BD_ADDR or a cellular phone ID, however other identification schemes may be employed.

In step 430, a determination is made whether a candidate cellular device with a less congested cell or available resources is located.

In step 440, a determination is made whether the predetermined time interval allotted for finding a free cell or alternative available resources has timed out. This step is optional, in that priority Bluetooth device 38 could simply continue seeking candidate cells until one or more are found (i.e., until it receives a FREE_CELL_FOUND message). Alternatively, if the time interval has been exceeded, priority Bluetooth device 38 may, in step 450, declare that no less-congested cells or no alternative radio resource can be found. The predetermined time interval preferably takes into account the time required for the FIND_FREE_CELLS message to propagate to all devices in the scatternet 84 and for the FREE_CELL_FOUND message to be returned.

If no free cells or alternative radio resource are found and the time interval has not run out, processing continues to step 460, wherein priority Bluetooth device 38 instructs the members 71–75 of priority piconet 82 to perform INQUIRY procedures in order to extend the range of the priority piconet by connecting to other in-range public Bluetooth devices 76–80 to form a scatternet 84. Neighboring devices 71–75 become masters of the individual piconets they construct. A second layer (or tier) of interconnected piconets (i.e., scatternet 84) is formed, as illustrated in FIG. 7 by the dotted lines connecting neighboring devices 71–75 of the priority piconet 82 to the more distant devices 76–80 that they bring into the scatternet. The priority Bluetooth device 38 is both the master of the priority piconet 82 and the extended scatternet 84. The priority scatternet formation is controlled by the master Bluetooth device 38, thus the scatternet will continue to grow its size unless the master Bluetooth device instructs it not to do so.

In step 470, the priority Bluetooth device 38 again broadcasts a FIND_FREE_CELLS message. Once each member in the first layer of the scatternet (neighboring devices 71–75) receives the message, it first checks to see whether its cell loading status is marked cell free or if it has available alternative resources. If not, each first layer member will forward the message to the devices 76–80 in the extended layer it created. Each first layer member (neighboring devices 71–75) also keeps a local copy of the FIND_FREE_CELL message, so that when it receives another copy of the same FIND_FREE_CELL message, the copy of message may be discarded or ignored. In order to forward the FIND_FREE_CELL message to the devices 76–80 in the second layer (and beyond), inter-piconet scheduling is required. The priority Bluetooth device 38 will place the first layer neighboring devices 71–75 in HOLD mode for a number of slots. During this HOLD period, neighboring devices 71–75 can become masters of their own piconet to communicate with the respective devices 76–80 in the second layer. In subsequent iterations, the same process is used to extend the scatternet 84 and query for free cells beyond the second layer, i.e., the first layer neighboring devices 71–75 acting as masters of their own piconets can in turn put the devices 76–80 in HOLD mode for a number of slots. And the same procedure continues.

The process then returns to step 430, wherein another determination whether candidate cells were found is made.

If the cell loading status data of a Bluetooth device that has received a FIND_FREE_CELLS message indicates that a free cell or alternative resources do exist, the process transits to the information gathering protocol 500, wherein that candidate device will return a FREE_CELL_FOUND message. Candidate devices are necessarily only devices that have embedded in them both cell logic modules and WAHN logic modules, because the cell loading or alternative radio resource information is only available to such devices. In the scatternet 84 illustrated in FIG. 7, the set of devices eligible to be candidate devices are devices 73 and 75, based on potentially available alternative resources in cell 12B, and devices 76, 77, 78 and 80 based either on potentially available alternative resources or on their reflecting less congestion in cells 12A and 12C. Once a route has been discovered between the priority Bluetooth device 38 and one or more candidate devices, thus also has been discovered a means for the priority user to gain access to the desired cellular service.

Figure 5:
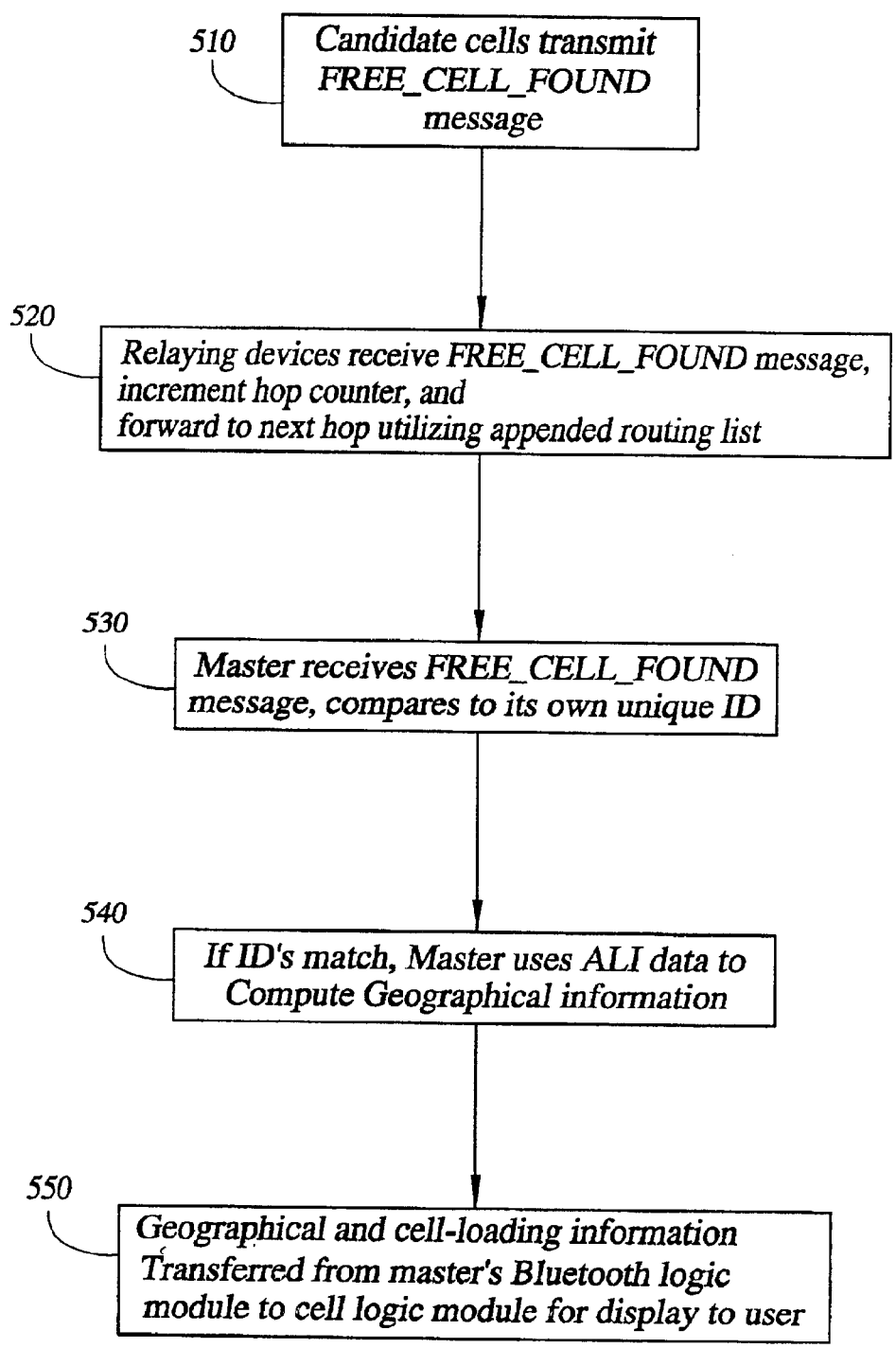
FIG. 5 is a flowchart depicting an embodiment of the information gathering protocol provided by the present invention.

FIG. 5 is a flowchart illustrating an embodiment of information gathering protocol 500 that addresses routing through scatternet 84 for the purpose of providing the priority Bluetooth device 38 with routing information necessary for the computation of topological information to be provided to the user.

In step 510, a candidate device that is located in a free cell receives a FIND_FREE_CELLS message 86 returns a FREE_CELL_FOUND message 96, such as shown in FIG. 9, utilizing the address routing list 94 appended to the FIND_FREE_CELLS message 86. In effect, a dynamic source routing protocol is employed, whereby the addresses of all the hops used in routing are listed in the FREE_CELL_FOUND message. (A discussion of routing methods can be found in P. Bhagwat, et al., "A Routing Vector Method (RVM) for Routing in Bluetooth Scatternets", $6^{th}$ *IEEE International Workshop on Mobile Multimedia Communications,* 1999, the contents of which are incorporated herein by reference.) Also included in FREE_CELL_FOUND message 96 are: an identification 98 of the cell in which the candidate device is locate; cell loading data 100 for that candidate cell; the ALI data 102 for that particular candidate device; the master Bluetooth ID 104 of the priority Bluetooth device to which the candidate device is responding; a hop counter 106 initially set to zero; a sequence number 108; and a time stamp 110 reflective of the instant that the FREE_CELL_FOUND message 96 was sent. A one-slot Bluetooth packet can accommodate 27 bytes of payload information. If one packet is insufficient, multiple packets identified by their sequence numbers may be employed.

In step 520, Bluetooth devices located in the route between the priority Bluetooth device 38 and the one or more candidate devices receive FREE_CELL_FOUND message 96, examine addresses on appended routing list 94, and forward the message to the next hop indicated on the routing list 94. When forwarding the FREE_CELL_FOUND message to the next Bluetooth device listed in routing list 94, the relaying Bluetooth devices increment the hop counter 106 by one to indicate that they are one more hop away from the priority Bluetooth device 38. A relaying Bluetooth device is defined as a device that interconnects two piconets. Each relaying Bluetooth device keeps a copy of the FREE_CELL_FOUND message 96. If the relaying device receives another copy of the same FREE_CELL_FOUND message, the message can be discarded.

In step 530, when the priority Bluetooth device 38 receives one or more FREE_CELL_FOUND messages, it first checks whether the message is responding to its own FIND_FREE_CELLS message by matching its own Bluetooth ID 88 with the master Bluetooth ID 104 in the response message.

In step 540, if the ID's match, the priority Bluetooth device 38 can use the ALI data 102 reported in the FREE_CELL_FOUND message 96 to calculate topological information, comprising the distance and the direction to reach each candidate device. Assuming that the location of the priority Bluetooth device 38 is $x_p$ and $y_p$, and that the location of a candidate device is $x_t$, $y_t$, then the direction to the candidate device (and thus, to the free cell or available resource) may be calculated per the formula $$\text{Azimuth } \theta = \tan^{-1}|(x_t-x_p)|/|(y_t-y_p)|,$$

and the distance to the candidate device (free cell or available resource) may be calculated per the formula $$\text{Distance } d=[(x_t-x_p)^2+(y_t-y_p)^2]^{0.5}.$$

In step 550, the calculated directional information, free cell identification 98, and free cell loading data 100 or alternative radio resource and time stamp 110 are communicated from the Bluetooth logic module 38 of the user's cellular device 34 to its corresponding cell logic module 36. The Bluetooth logic and cell logic modules communicate with each other via a Application Programming Interface wherein commands and data are used to accomplish the tasks described herein. The cell logic module 36 then provides a message, through an interface that can be visual or audial or any other effective means, to the user of the priority cellular device 34. The message may include the following information: a list of candidate free cells or alternative radio resource; the corresponding cell loading status of each of the candidate cells; directional information to the respective candidate cells; and a time indicating how current the information being provided is, based upon time stamp 110. For example, a visual display 112 of a cellular phone 114 may reflect results as illustrated in FIG. 6. The "time elapsed" data 116 shown on the display 112 is the difference between the time stamp 110 and the current time when the display is being viewed.

As discussed above, it is also possible that there are not enough Bluetooth devices available to form a scatternet, or that no free cells could be located in the predetermined time interval. In this case, a message reflecting as much may be displayed with or without an indication of the current cell loading of the cell in which the user is presently located.

This information, as mentioned above, enables a user requesting PAS to make a determination which less congested candidate cell to proceed to, or whether to remain in his current cell and acquire the alternative resource. The priority user can update the display 112 on cellular phone 114 by executing the same procedure again, such that the priority user can always get the most recent information on cell loading status.

Alternative Embodiments
Non-Emergency Use and Cell Load Redistribution

Although the systems and methods described above were developed for NS/EP users, this proposal can also be utilized by the general public.

For example, the message provided to a public user requesting cellular service can take the form of an instruction to move to a new cell location before access will be granted. The instruction may be given for the purpose of cell load balancing and/or quality of service reasons (the public user may obtain topological information relating to nearby cells with better grade of service and determine whether to move to one of them or simply wait for the cell in which the user is currently located becomes free or less congested). Re-distributing public user cell loading evenly among cells can increase a cellular network's capacity. As a result, the Applicants propose to allow the general public to utilize this inventive system during non-emergency situations. During emergency situations, only priority NS/EP users will be allowed to activate this feature.

To ensure compliance, a means for granting access to the system based upon a user's authorization (or priority class) and/or upon the existence of emergency usage conditions may optionally be employed. Existing priority access technologies may be leveraged for this purpose. For example, GSM enhanced multi-level precedence and preemption (EMLPP) standards support precedence and preemption. Precedence involves the assignment of a priority level to a user. EMLPP supports a maximum of 7 priority levels.

Peer-to-Peer Communications

With a slight modification, the systems and methods described above can also be used in establishing peer-to-peer communications between priority users. In this case, a first priority user is connected to a second priority user by treating the second priority user as analogous to the Bluetooth device whose cell is marked free or less congested. The routing procedure for the first priority user's Bluetooth device to reach the target Bluetooth device is simply to route messages (e.g., SMS) via intervening Bluetooth devices utilizing a least hop count route.

Other embodiments of the invention will be apparent to those skilled in the art from a consideration of the specification or practice of the invention disclosed herein. As stated above, a specific implementation of the WAHN is described in terms of Bluetooth technology, but other embodiments also within the scope of the present invention. It is intended that the specification and examples be considered as exemplary only, with the true scope and spirit of the invention being indicated by the following claims.

We claim:

1. A method of providing cellular priority access to a user, comprising the steps of:

providing a plurality of devices each having an embedded wireless ad hoc networking (WAHN) logic module, the plurality including a first cellular device and at least one candidate cellular device each E-911 enabled and having an embedded cell logic module;

requesting priority access service via the first cellular device;

via the cell logic modules,
receiving cell loading information transmitted by a base station, and
transferring the cell loading information to a corresponding WAHN logic module in the same cellular device;

via the WAHN logic modules,
forming a scatternet among the plurality of devices, the scatternet including the first cellular device and at least one candidate cellular device whose cell loading is less congested than the cell loading of the first cellular device,
gathering cell location, cell loading status, and radio resource information from the at least one candidate cellular device, and transmitting the gathered information to the WAHN logic module of the first cellular device;

receiving the transmitted and gathered information at the first cellular device WAHN logic module;

computing topological information based upon the gathered and transmitted information;

communicating the topological information to the cell logic module of the first cellular device;

providing a visual or audial message reflective of the topological information to a user of the first cellular device that may be utilized in placing a cellular call.

2. A method of providing cellular priority access to a user, comprising the steps of:

providing a plurality of devices each having an embedded wireless ad hoc networking (WAHN) logic module, the plurality including a first cellular device and at least one candidate cellular device each E-911 enabled and having an embedded cell logic module;

requesting priority access service via the first cellular device;

via the cell logic modules,
receiving cell loading information transmitted by a base station, and transferring the cell loading information to a corresponding WAHN logic module in the same cellular device;
via the WAHN logic modules,
forming a scatternet among the plurality of devices, the scatternet including the first cellular device and at least one candidate cellular device whose cell is free of congestion,
gathering the cell location, cell loading status, and radio resource information from the at least one candidate cellular device whose cell is free of congestion, and
transmitting the gathered information to the WAHN logic module of the first cellular device;
receiving the transmitted and gathered information at the first cellular device WAHN logic module;
computing topological information based upon the gathered and transmitted information;
communicating the topological information to the cell logic module of the first cellular device;
providing a visual or audial message reflective of the topological information to a user of the first cellular device; and
utilizing the topological information to place a cellular call.

3. A method of providing guidance to a cellular user to a less congested cell, comprising the steps of:
providing a plurality of devices each having an embedded wireless ad hoc networking (WAHN) logic module, the plurality including a first cellular device and at least one candidate cellular device each E-911 enabled and having an embedded cell logic module;
requesting guidance to a less congested cell via the first cellular device;
determining whether a user of the cell phone is authorized access to the less congested cell based on the existence of emergency usage conditions and a priority class of the user;
via the cell logic modules,
receiving cell loading information transmitted by a base station, and
transferring the cell loading information to a corresponding WAHN logic module in the same cellular device;
via the WAHN logic modules,
forming a scatternet among the plurality of devices, the scatternet including the first cellular device and at least one candidate cellular device whose cell is free of congestion,
gathering the cell location, cell loading status, and radio resource information from the at least one candidate cellular device whose cell is free of congestion,
transmitting the gathered information to the WAHN logic module of the first cellular device;
receiving the transmitted and gathered information at the first cellular device WAHN logic module;
computing topological information based upon the gathered and transmitted information;
communicating the topological information to the cell logic module of the first cellular device;
providing visual or audial guidance reflective of the topological information to the user.

4. A method of providing guidance to a cellular user having no present cellular coverage, comprising the steps of:
providing a plurality of devices each having an embedded wireless ad hoc networking (WAHN) logic module, the plurality including a first cellular device and at least one candidate cellular device each E-911 enabled and having an embedded cell logic module;
requesting guidance to an accessible cell via the first cellular device;
via the cell logic modules,
receiving cell loading information transmitted by a base station, and
transferring the cell loading information to a corresponding WAHN logic module in the same cellular device;
via the WAHN logic modules,
forming a scatternet among the plurality of devices, the scatternet including the first cellular device and at least one candidate cellular device whose cell is accessible,
gathering the cell location, cell loading status, and radio resource information from the at least one candidate cellular device whose cell is accessible, and
transmitting the gathered information to the WAHN logic module of the first cellular device;
receiving the transmitted and gathered information at the first cellular device WAHN logic module;
computing topological information based upon the gathered and transmitted information;
communicating the topological information to the cell logic module of the first cellular device;
providing visual or audial guidance reflective of the topological information to the user.

5. The method of claim 4, further comprising the step of:
determining whether a user of the cell phone is authorized access to the accessible cell based on the existence of emergency usage conditions and a priority class of the user.

6. A method of re-distributing public user cell loading, comprising the steps of:
providing a plurality of devices each having an embedded wireless ad hoc networking (WAHN) logic module, the plurality including a first cellular device and at least one candidate cellular device each E-911 enabled and having an embedded cell logic module;
requesting cell access service via the first cellular device;
via the cell logic modules,
receiving cell loading information transmitted by a base station, and
transferring the cell loading information to a corresponding WAHN logic module in the same cellular device;
via the WAHN logic modules,
forming a scatternet among the plurality of devices, the scatternet including the first cellular device and at least one candidate cellular device whose cell is less congested,
gathering the cell location, cell loading status, and radio resource information from the at least one candidate cellular device whose cell is less congested, and
transmitting the gathered information to the WAHN logic module of the first cellular device;
receiving the transmitted and gathered information at the first cellular device WAHN logic module;
computing topological information based upon the gathered and transmitted information;
communicating the topological information to the cell logic module of the first cellular device;

instructing, via a visual or audial message reflective of the topological information, the user of the first cellular device to move to the less congested cell for cell access, thereby re-distributing the cell loading.

7. The methods of claim 1, 2, 3, 4 or 6, wherein the WAHN logic modules are comprised of a Bluetooth module.

8. The methods of claim 1, 2, 3, 4 or 6, wherein the visual or audial message includes one or more indicators related to candidate free cells corresponding to the at least one candidate cellular device.

9. The method of claim 8, wherein the one or more indicators include the directions of the candidate free cells, the distances to the candidate free cells, the cell loading of the candidate free cells, and a time stamp corresponding to each free cell indicative of when the free cell was determined to be free.

10. The methods of claim 1, 2, 3, 4 or 6, wherein the visual or audial message includes identification of alternative radio resources that can be utilized in candidate free cells corresponding to the at least one candidate cellular device.

11. The method of claim 10, wherein the alternative radio resources include one or more alternative frequency, code, service provider, or private network that can be utilized.

12. The method of claim 10, further comprising the step of:
acquiring access to the alternative radio resources.

13. The methods of claims 1 or 2, further comprising the step of:
providing cellular access based upon a priority class assigned to the user.

14. The methods of claims 1 or 2, further comprising the step of:
routing messages from the first cellular device to one or more of the candidate cellular devices via the scatternet.

15. The method of claim 14, wherein the messages are routed via a route with a minimum hop count.

16. A telecommunications system, comprising:
a plurality of devices each having an embedded wireless ad hoc networking (WAHN) logic module, the plurality including a first cellular device and at least one candidate cellular device each being E-911 enabled and having an embedded cell logic module;
wherein the cell logic modules are adapted to
receive cell loading status information transmitted from a base station,
communicate the cell loading status information to a WAHN logic module in the corresponding cellular device,
receive a request for cell access from a user of the first cellular device,
receive topological information from the corresponding WAHN logic module, and
provide a visual or audial message reflective of the topological information to the requesting user of the first cellular device;
wherein the WAHN logic modules are adapted to
receive the cell loading information from a cell logic module in the corresponding cellular device,
indicate the cell loading information corresponding to the cell in which the WAHN logic module is located,
execute a protocol for forming a scatternet among the plurality of devices such that the first cellular device is interconnected with the at least one candidate cellular device,
execute a protocol for gathering cell location, cell loading status, and radio resource information from the at least one candidate cellular device,
execute a protocol for computing topological information based upon the cell location, cell loading status, and radio resource information gathered from the at least one candidate cellular device, and
communicate the topological information to the cell logic module of the first cellular device.

17. The telecommunications system of claim 16, wherein the WAHN logic module is comprised of a Bluetooth module.

18. The telecommunications system of claim 16, wherein the WAHN logic module is comprised of a 802.11 module.

19. The telecommunications system of claim 16, wherein the visual or audial message includes one or more indicators related to a less congested cell.

20. The telecommunications system of claim 19, wherein the one or more indicators include the direction of the less congested cell, the distance to the less congested cell, the cell loading of the less congested cell.

21. The telecommunications system of claim 16, wherein the visual or audial message includes identification of alternative radio resources that can be utilized in a less congested cell.

22. The telecommunications system of claim 21, wherein the alternative radio resources include one or more alternative frequency, code, service provider, or private network that can be utilized.

23. The telecommunications system of claim 21, wherein the cell logic modules are further adapted to acquire access to the alternative radio resources.

24. The telecommunications system of claim 16, wherein the visual or audial message is an instruction to a user of the first cellular device to relocate to a less congested cell for the purpose of cell balancing.

25. The telecommunications system of claim 16, wherein the cell logic modules and WAHN logic modules are further adapted to provide cellular access to a user based upon a priority class assigned to the user.

26. The telecommunications system of claim 16, further comprising means for determining public or emergency use authorizations.

27. The telecommunications system of claim 16, wherein the cell logic modules and WAHN logic modules are further adapted to route messages from the first cellular device to the at least one candidate cellular devices via the formed scatternet.

28. The telecommunications system of claim 27, wherein the messages are routed via a route with a minimum hop count.

29. The telecommunications system of claim 16, wherein the scatternet formation protocol comprises the steps of:
forming a priority piconet with the WAHN logic of the first cellular device as the scatternet master;
determining whether any of the members of the priority piconet have free cells;
if no members have free cells, repeating the following steps for a predetermined interval or until a free cell is found:
extending the scatternet by forming additional piconets in which the members of the priority piconets are the masters, and
instructing the members of the priority piconet to determine whether any of the members of the additional piconets have free cells;
if no free cells are found by the end of the interval, declaring that no free cells can be found.

30. The telecommunications system of claim 16, wherein the information gathering protocol comprises the step, once a free cell has been found, of:

returning a free cell found message to the first cellular device;

wherein the free cell found message includes addresses of each member hop used in interconnecting the first cellular device to the at least one candidate cellular device, a free cell identification and loading status, a location of the at least one candidate cellular device, a hop count, and a time stamp of when the free cell found message was returned.

31. The telecommunications system of claim 16, wherein the protocol for computing topological information comprises the steps of:

acquiring a present location ($x_p$, $y_p$) of the first cellular device;

acquiring at least one free cell location ($x_r$, $y_r$) corresponding to the location of the at least one candidate cellular device;

calculating the distance between the first cellular device and at least one free cell per the formula $$\text{Distance} = [(x_r - x_p)^2 + (y_r - y_p)^2]^{0.5}; \text{ and}$$

calculating the direction toward at least one free cell from the first cellular device per the formula $$\text{direction Azimuth } \theta = \tan^{-1} |(x_r - x_p)| / |(y_r - y_p)|.$$

* * * * *